US006499851B1

(12) United States Patent
Kelly et al.

(10) Patent No.: US 6,499,851 B1
(45) Date of Patent: Dec. 31, 2002

(54) TRAILER BACK-UP MIRROR

(76) Inventors: Louis S. Kelly, 4313 Kristen, Shreveport, LA (US) 71119; Glen E. Kelly, 9897 Hidden Branch La., Shreveport, LA (US) 71118

( * ) Notice: Subject to any disclaimer, the term of this patent is extended or adjusted under 35 U.S.C. 154(b) by 23 days.

(21) Appl. No.: 09/695,431

(22) Filed: Oct. 23, 2000

Related U.S. Application Data

(60) Provisional application No. 60/161,058, filed on Oct. 25, 1999.

(51) Int. Cl.$^7$ .......................... G02B 5/10; G02B 7/182; B60R 1/00
(52) U.S. Cl. ...................... 359/850; 359/864; 359/872; 359/881; 359/903; 33/264; 248/480; 280/477
(58) Field of Search ................................ 359/850, 855, 359/864, 865, 866, 872, 881, 903; 33/264; 280/477; 248/480

(56) References Cited

U.S. PATENT DOCUMENTS

| 3,295,914 A | | 1/1967 | Dietrich ...................... 350/307 |
| 3,524,701 A | | 8/1970 | Strohmeier ................. 350/307 |
| 3,767,292 A | | 10/1973 | Rutkowski ................. 350/293 |
| 4,163,606 A | | 8/1979 | Granno ........................ 350/307 |
| 4,486,075 A | * | 12/1984 | Cohen |
| 4,865,380 A | * | 9/1989 | Heitzman-Powell et al. |
| 5,309,289 A | | 5/1994 | Johnson ........................ 359/871 |
| 5,453,915 A | * | 9/1995 | Bradley, III |
| 5,784,213 A | * | 7/1998 | Howard |
| 5,825,564 A | | 10/1998 | Mazarac ...................... 359/872 |
| 6,076,847 A | * | 6/2000 | Thornton |
| 6,213,608 B1 | * | 4/2001 | Osgood |
| 6,217,180 B1 | * | 4/2001 | Eisenbraum |
| 6,239,926 B1 | * | 5/2001 | De Shazer |
| 6,293,681 B1 | * | 9/2001 | Frank |

OTHER PUBLICATIONS

"Camping World" Catalog 1999, Annual p. 205(D)–"EZ Hitcher" & (E)–"Hitch Align" pp. 205.

* cited by examiner

Primary Examiner—Ricky D. Shafer
(74) Attorney, Agent, or Firm—John M. Harrison

(57) ABSTRACT

A trailer back-up mirror which can be-removably attached to the frame of a boat, camper, recreational vehicle or other trailer for facilitating alignment of the hitch ball on a towing vehicle with the trailer hitch as the vehicle is backed toward the trailer, in order to couple the trailer hitch to the hitch ball. In a preferred embodiment the trailer back-up mirror is characterized by a support shaft which is magnetically and removably attached to the trailer frame. An adjusting shaft is adjustably extendible from the support shaft and a flexible gooseneck shaft extension projects from the extending end of the adjusting shaft. A rectangular mirror mount plate terminates the shaft extension and a flat mirror and convex mirror are mounted on the mirror mount plate. In use, the gooseneck shaft extension is initially adjusted to position the mirror mount plate such that the trailer hitch and hitch ball appear in the convex mirror, and the trailer hitch appears in the flat mirror.

14 Claims, 3 Drawing Sheets

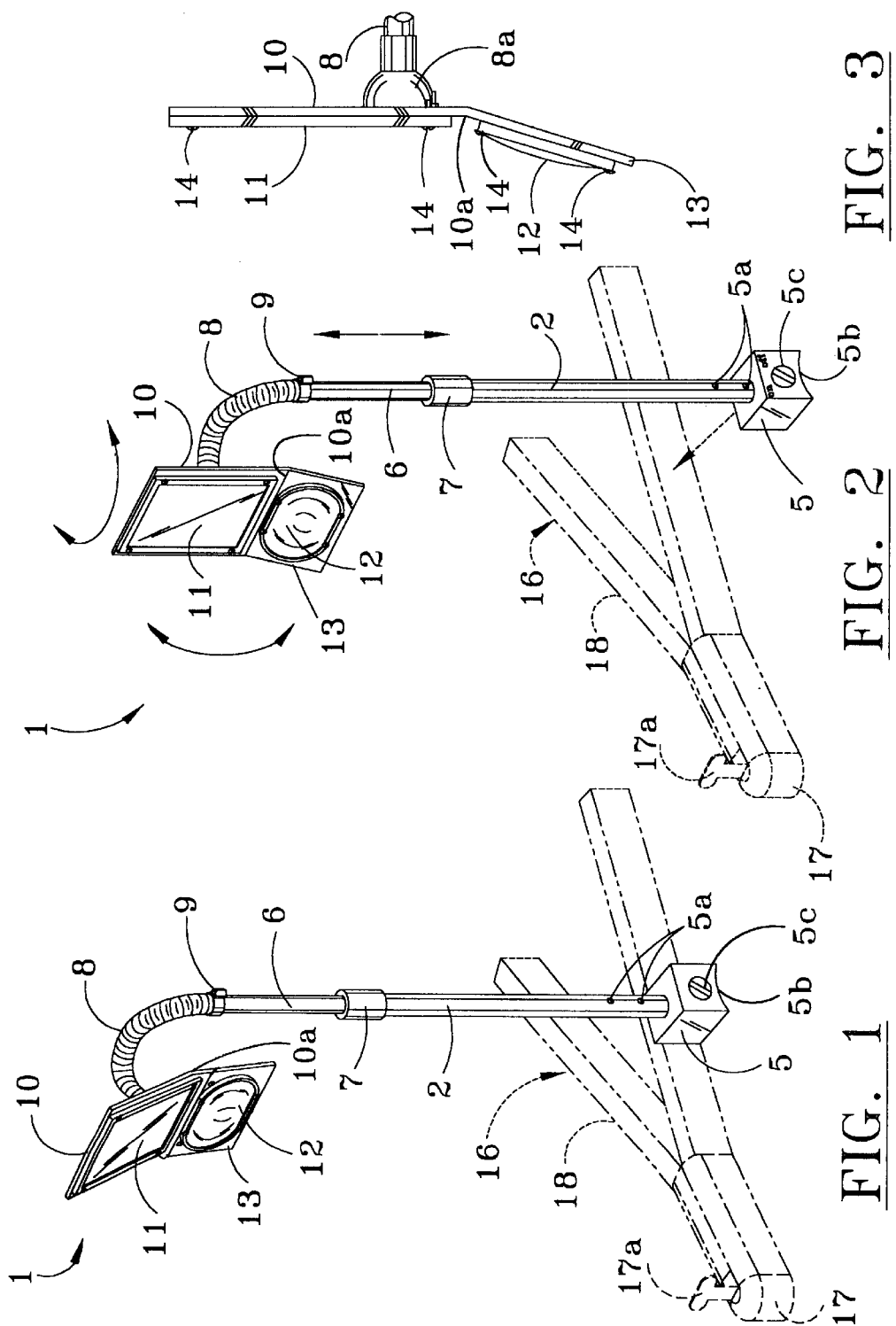

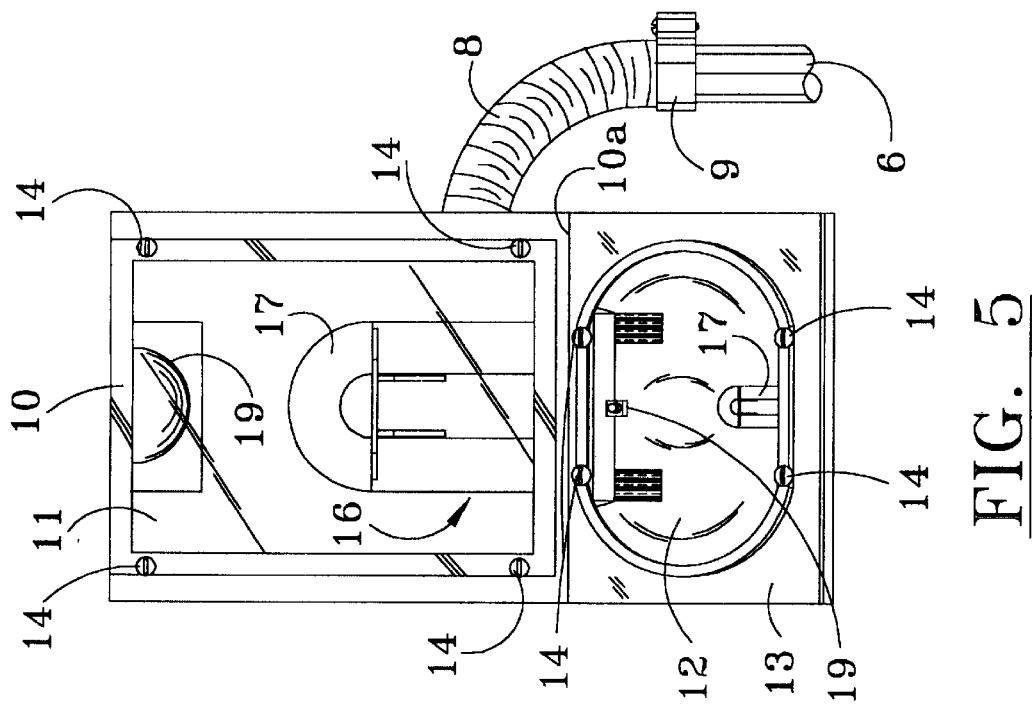
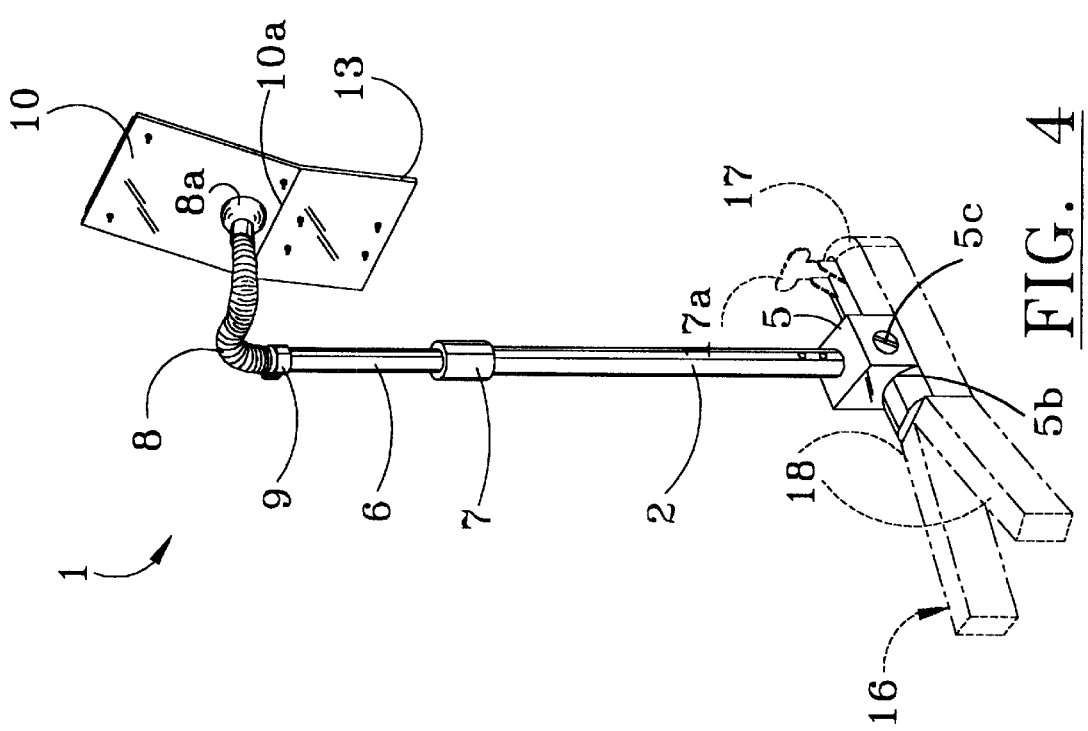

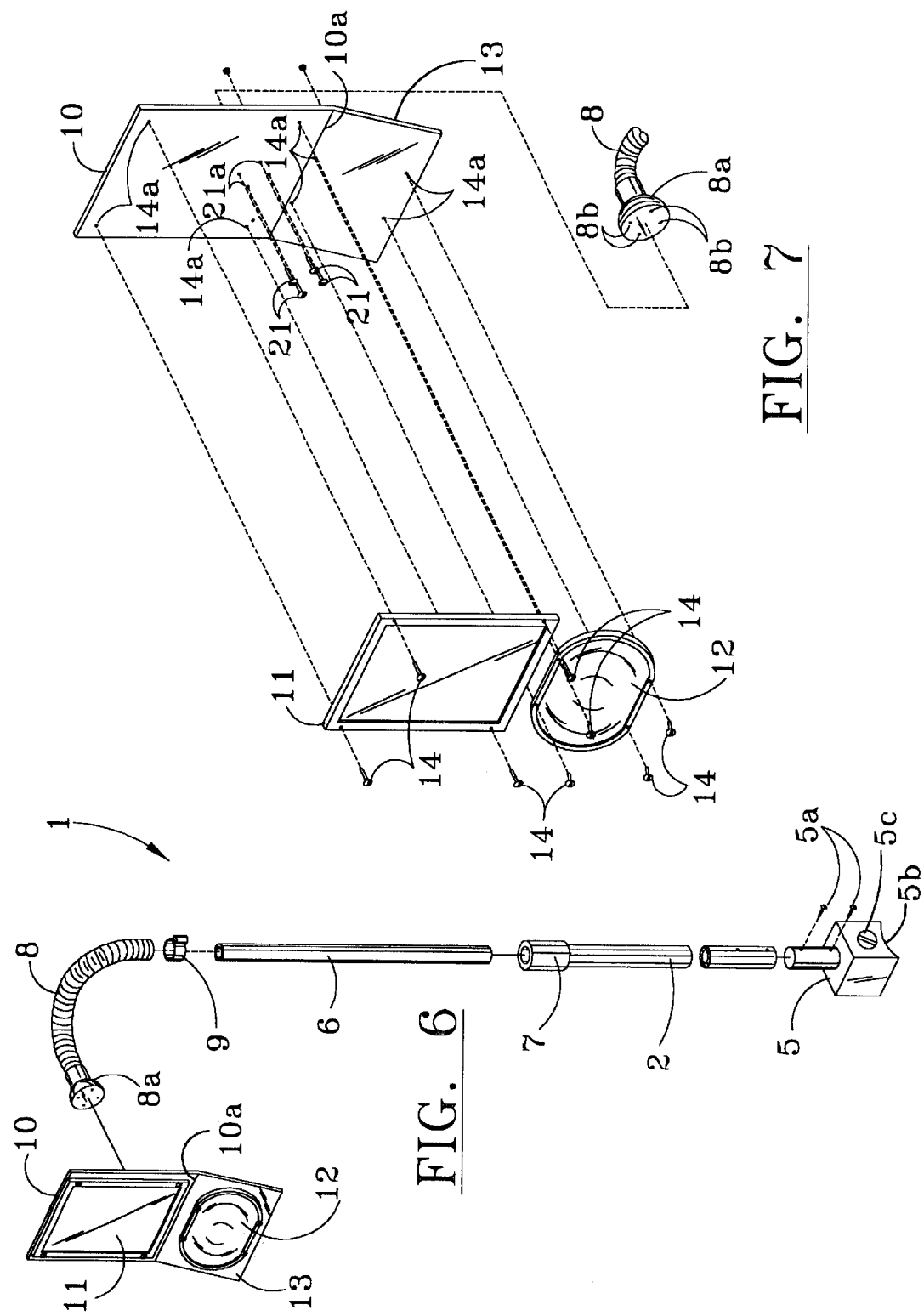

TRAILER BACK-UP MIRROR

CROSS-REFERENCE TO RELATED APPLICATIONS

This application claims the benefit of copending U.S. Provisional Application Serial No. 60/161,058, filed Oct. 25, 1999.

BACKGROUND OF THE INVENTION

1. Field of the Invention

This invention relates to devices for facilitating alignment of a hitch ball on a towing vehicle with a trailer hitch and more particularly, to a trailer back-up mirror which is removably attached to the frame of a boat, camper, recreational vehicle or other trailer for facilitating alignment of the hitch ball on a towing vehicle with the trailer hitch as the vehicle is backed toward the trailer, in order to couple the trailer hitch to the hitch ball. In a preferred embodiment the trailer back-up mirror is characterized by a support shaft fitted with a magnet for magnetically and removably attaching the support shaft to the trailer frame. An adjusting shaft is typically adjustably extendible from the support shaft, and a flexible gooseneck shaft extension projects from the extending end of the adjusting shaft. A typically rectangular mirror mount plate terminates the gooseneck shaft extension and a flat mirror and a convex mirror are mounted on the bent mirror mount plate. In use, the gooseneck shaft extension is initially adjusted to position the mirror mount plate such that both the trailer hitch and hitch ball appear in the convex mirror and only the trailer hitch appears in the flat mirror. As the towing vehicle is backed toward the trailer hitch, the driver of the vehicle views the mirrors, either directly or through the rearview mirror of the vehicle. The convex mirror provides a general indication of whether the hitch ball is aligned with the trailer hitch, thus enabling the driver to correctively maneuver the vehicle as needed for proper alignment until the trailer hitch and hitch ball both appear in the flat mirror. The enlarged image in the flat mirror gives the vehicle driver a more precise indication of whether the hitch ball is aligned with the trailer hitch, and this enables the driver to further maneuver the vehicle in order to successfully guide the hitch ball to the hitch.

Boat, camper and recreational vehicle trailers and the like are commonly transported by hitching the trailers to towing vehicles by means of a ball and socket type hitch assembly, in which a hitch ball is mounted on the rear frame portion of the towing vehicle and the trailer is provided with a hitch socket which is adapted to securely receive the hitch ball. A common problem inherent in the ball and socket hitching operation is difficulty in obtaining the necessary alignment of the hitch ball with the hitch socket to effect coupling, since the hitch ball is typically out of view of the driver of the towing vehicle as the vehicle is backed toward the trailer. Consequently, the driver typically experiences substantial difficulty in maneuvering the vehicle to effect proper alignment of the hitch ball with the hitch.

One technique that is frequently used to effect proper alignment of the hitch ball with the hitch involves positioning an observer at the rear of the towing vehicle to indicate to the driver maneuverings of the vehicle which are needed for the alignment. However, an observer is not always available to assist in the hitching operation. Consequently, various mirror devices have been designed for indicating to the driver of a towing vehicle whether the hitch ball of the vehicle is located in proper alignment with the trailer hitch for successful hitching. However, most of these mirrors are designed to be fixedly mounted on the frame of the trailer and are incapable of convenient removal and adjustment for use with other trailers of various sizes and designs.

2. Description of the Prior Art

Various devices are known in the art for enabling the driver of a towing vehicle to achieve proper alignment of a hitch ball on the vehicle with a trailer hitch during a trailer hitching operation. One of the early devices is detailed in U.S. Pat. No. 3,295,914, dated Jan. 3, 1967, to William Dietrich, entitled "Hitch Guide Mirror for Mounting on a Trailer Jack Housing". The device is characterized by a support arm which is clamped vertically on the trailer jack housing of a trailer jack, and angles over the top of the housing. An adjustable mirror is attached by means of a ball-and-socket joint to the upper end of the support arm. The angle of the mirror is initially adjusted on the support arm such that the trailer hitch appears in the mirror as the vehicle is subsequently backed toward the trailer. U.S. Pat. No. 3,524,701, dated Aug. 18, 1970, to Robert J. Strohmeier, details a "Trailer Hitch Viewing Mirror Assembly for Mounting on a Trailer Jack Post", characterized by a malleable metallic support arm having a mirror attached to the upper end thereof and a magnet attached to the lower end thereof for attaching the support arm to the jack post of a trailer. The support arm can be bended at a selected angle to cause appearance of the hitch ball and trailer hitch in the mirror, thus enabling the driver of the towing vehicle to properly maneuver the vehicle and align the hitch ball with the trailer hitch. An "Aligning Device for Tractor Hitches" is disclosed in U.S. Pat. No. 3,767,292, dated Oct. 23, 1973, to Phillip R. Rutkowski. The device includes a bracket which is adapted to be mounted on a cooking gas tank, provided on the front of a camper trailer. A pair of support arms extends forwardly from the bracket, and a convex mirror mounted on the front ends of the support arms enables the driver of a towing vehicle to simultaneously view the hitch ball of the vehicle and the hitch of the trailer in the mirror as the vehicle is backed toward the trailer. U.S. Pat. No. 4,163,606, dated Aug. 7, 1979, to Peter M. Granno, describes a "Hitch Viewing Trailer Mirror With Snap Button Connection" which is designed for attachment to a pair of gas-containing tanks provided on the front end of a camper trailer. The device is characterized by a channel-shaped cross member which spans the adjacent gas tanks, and a support rod is adjustably horizontally extendible from the front end of a support member which extends forwardly from the cross member. A mirror, pivotally attached to a support arm which is vertically adjustably connected to the support rod, can be adjusted on the support arm to enable the driver of a towing vehicle to simultaneously view the hitch ball of the vehicle and the hitch of the camper trailer during the hitching operation. An "Optical Target System for Trailer Hitch Alignment" is disclosed in U.S. Pat. No. 5,309,289, dated May 3, 1994, to Brady G. Johnson. The device includes first and second targets which can be removably positioned in referencing relationship with respect to the hitch ball of a towing vehicle and a trailer hitch. A viewing mirror can be removably positioned on the trailer to provide the driver of the towing vehicle with a reflected view of the two targets. Each of the targets includes a longitudinal guidance element that is disposed in alignment with the longitudinal axis of the vehicle or trailer, respectively, and a transverse guidance element which is transversely oriented with respect to the respective longitudinal guidance elements and located above the hitch assembly component to provide a visual reference to a vertical axis which extends through those components. U.S. Pat. No. 5,825,564, dated Oct. 20, 1998, to Kevin P. Mazarac, describes a "Rear-Mounted Vehicle Mirror", characterized by a mounting member which is adapted to engage the rear of a towing vehicle, and a support arm slidably carried by the mounting member is positioned at an acute angle relative to the vehicle surface. A convex mirror is mounted to the support arm for viewing a trailer hitch as the hitch ball of the towing vehicle is backed toward the trailer hitch. "Camping World" annual 1999 catalog details a pair of trailer alignment devices utilizing mirrors.

An object of this invention is to provide a trailer back-up mirror for facilitating proper alignment of a towing vehicle with the hitch of a trailer, to facilitate coupling the vehicle to the trailer hitch.

Another object of this invention is to provide a trailer back-up mirror which can be removably attached to the frame of a boat, camper, recreational vehicle or other trailer for facilitating alignment of the hitch ball on a towing vehicle with the trailer hitch as the vehicle is backed toward the trailer, in order to couple the trailer hitch to the hitch ball.

Still another object of this invention is to provide a trailer back-up mirror system which utilizes both a convex and a flat mirror and can be removably attached to trailers of various designs for facilitating alignment of the hitch ball on a towing vehicle with the trailer hitch as the vehicle is backed toward the trailer, in order to couple the trailer hitch to the hitch ball.

Yet another object of this invention is to provide a trailer back-up mirror characterized by a support shaft which can be removably and magnetically attached to the frame of a boat, recreational vehicle or camper trailer; an optional adjusting shaft adjustably extendible from the support shaft; a flexible gooseneck shaft extension which extends from the support shaft or the adjusting shaft and a convex mirror and a flat mirror provided on a bent support or mount plate attached to the end of the gooseneck shaft extension, wherein the gooseneck shaft extension is initially adjusted such that the hitch ball of the towing vehicle and the trailer hitch both appear in the convex mirror and the trailer hitch appears as a larger image in the flat mirror. The convex mirror gives the vehicle driver a large field of vision and provides a general indication of whether the hitch ball is aligned with the trailer hitch and thus enables the driver to maneuver the vehicle accordingly until the trailer hitch and hitch ball both appear in the flat mirror, which enlarges the hitch ball and trailer hitch images and provides a more precise indication of whether the hitch ball is aligned with the trailer hitch and thus enables the driver to maneuver the vehicle more precisely in order to successfully guide the hitch ball to the hitch.

SUMMARY OF THE INVENTION

These and other objects of the invention are provided in a trailer back-up mirror which can be removably, and typically magnetically, attached to the frame of a boat, camper, recreational vehicle or other trailer for facilitating alignment of the hitch ball on a towing vehicle with the trailer hitch as the vehicle is backed toward the trailer, in order to couple the trailer hitch to the hitch ball. In a preferred embodiment the trailer back-up mirror is characterized by a support shaft fitted with a magnet for magnetically and removably attaching the support shaft to the trailer frame. An adjusting shaft is adjustably extendible from the support shaft, and a flexible gooseneck shaft extension projects from the extending end of the adjusting shaft. A typically rectangular, bent, or angular mirror mount plate terminates the shaft extension and a flat mirror and convex mirror are mounted on the mirror mount plate. In use, the gooseneck shaft extension is initially adjusted to cause appearance of the hitch ball and trailer hitch in the convex mirror and the trailer hitch in the flat mirror. As the towing vehicle is backed toward the trailer hitch, the driver of the vehicle views the mirrors, either directly or through the rearview mirror of the vehicle. The wide field of vision in the convex mirror on the lower leg of the bent plate gives the vehicle driver a general indication of whether the hitch ball is aligned with the trailer hitch, thus enabling the driver to correctively maneuver the vehicle as needed for alignment until the trailer hitch and hitch ball both appear as larger images in the flat mirror. The flat mirror on the upper leg of the bent plate provides a more precise indication of whether the hitch ball is aligned with the trailer hitch, and this enables the driver to further maneuver the vehicle in order to successfully guide the hitch ball to the hitch.

BRIEF DESCRIPTION OF THE DRAWINGS

The invention will be better understood by reference to the accompanying drawings, wherein:

FIG. 1 is a perspective view of a preferred embodiment of the trailer back-up mirror of this invention, removably and magnetically mounted on the frame of a trailer (illustrated in phantom, partially in section);

FIG. 2 is a perspective view of the trailer back-up mirror illustrated in FIG. 1, removed from the trailer and more particularly illustrating the universal positioning and vertical adjustment capabilities of the convex and flat mirror components of the trailer back-up mirror;

FIG. 3 is a side view, partially in section, of the flat and convex mirror components of the trailer back-up mirror, mounted on a common, bent, or angular mirror mount plate;

FIG. 4 is a rear perspective view of the trailer back-up mirror illustrated in FIG. 1;

FIG. 5 is a front view, partially in section, of the flat and convex mirrors of the trailer back-up mirror, with the hitch of a trailer appearing in aligned relationship with respect to a trailer hitch ball (provided on a towing vehicle) in each mirror, in application of the trailer back-up mirror;

FIG. 6 is an exploded, perspective view of the trailer back-up mirror; and

FIG. 7 is an exploded, perspective view, partially in section, of the trailer back-up mirror, more particularly illustrating typically bolted attachment of the flat and convex mirrors to the angular mirror mount plate, and typically bolted attachment of the mirror mount plate to the gooseneck shaft extension component of the invention.

DESCRIPTION OF THE PREFERRED EMBODIMENTS

Referring initially to FIGS. 1–3, 6 and 7 of the drawings, in a preferred embodiment the trailer back-up mirror of this invention is generally illustrated by reference numeral 1. As illustrated in FIG. 1, the trailer back-up mirror 1 is designed to be removably mounted on a boat, camper, recreational vehicle or other trailer 16 (illustrated in phantom) for facilitating proper alignment of the vehicle hitch ball 19 (FIG. 5) of a towing vehicle (not illustrated) with the trailer hitch 17 of the trailer 16, in order to facilitate coupling the hitch 17 with the vehicle hitch ball 19, as hereinafter described. The trailer back-up mirror 1 includes an elongated, hollow, typically aluminum or plastic support shaft 2, terminated on the upper end thereof by multiple conventional, flexible, typically plastic compression flanges (not illustrated). A shaft adjusting collar 7 is threaded on the upper end of the support shaft 2, and an adjusting shaft 6, slidably and telesopically extendible from the upper end of the support shaft 2, extends through the shaft adjusting collar 7 and compression flanges (not illustrated). Accordingly, as illustrated in FIG. 2, a selected length of the adjusting shaft 6 can be extended from the support shaft 2, and the adjusting shaft 6 locked in place in conventional fashion by threading the shaft adjusting collar 7 on the support shaft 2, thereby tightening the shaft adjusting collar 7 against the flexible compression flanges (not illustrated, provided on the upper end of the support shaft 2) and causing engagement of the compression flanges against the adjusting shaft 6. An attachment magnet 5, typically having a saddle 5b and a switch 5c, is secured to the support shaft 2, typically by means of bolts 5a, adjacent to the lower end of the support shaft 2 as illustrated in FIG. 6, to facilitate removable attachment of the trailer back-up mirror 1 to the trailer 16, as illustrated in FIG. 2 and hereinafter described.

As further illustrated in FIG. 1, a conventional, flexible gooseneck shaft extension 8 extends from typically clamped attachment by means of a hose clamp 9 to the adjusting shaft 6, or, in the absence of an adjusting shaft 6, to the top end of the support shaft 2, and the gooseneck shaft extension 8 terminates in an extension attachment flange 8a, as illustrated in FIGS. 4 and 7. A typically plastic or aluminum, preferably rectangular, bent, or angular mirror mount plate 10 is typically bolted to the extension attachment flange 8a, by extending multiple extension attachment bolts 21 (FIG. 7) through respective extension bolt openings 21a, provided in the mirror mount plate 10, and threading the extension attachment bolts 21 into respective extension flange openings 8b, provided in the extension attachment flange 8a. As illustrated in FIG. 2 and hereinafter further described, the flexible gooseneck shaft extension 8 permits universal positioning of the mirror mount plate 10 with respect to the adjusting shaft 6. A typically rectangular flat mirror 11 is mounted on the upper portion or leg of the mirror mount plate 10, typically by means of mirror mount bolts 14, which extend through the flat mirror 11 at respective corners thereof and are threaded through respective mirror bolt openings 14a, provided in the mirror mount plate 10, as illustrated in FIG. 7, and secured by nuts. A typically rectangular, aluminum or plastic convex mirror plate 13 is defined as a bottom portion or leg of the mirror mount plate 10, beneath and in a different plane from the upper portion or leg of the mirror plate 10, which mounts the flat mirror 11. As illustrated in FIG. 3, the convex mirror plate 13 is typically disposed at a selected angle with respect to the mirror mount plate 10 at the plate bend 10a. A typically elliptical, convex mirror 12 is mounted on the convex mirror plate 13 beneath the flat mirror 11, typically by means of mirror mount bolts 14, extending through bolt openings 14a in the convex mirror plate 13, and secured by additional nuts.

Referring again to FIGS. 1 and 2 and to FIGS. 4 and 5 of the drawings, in typical application of the trailer back-up mirror 1, the support shaft 2 is initially removably and magnetically attached to the trailer 16 at a selected location on the trailer frame 18, by means of the attachment magnet 5, as the switch 5c is moved to the "on" position. A vehicle hitch ball 19 (FIG. 5), provided on the rear end of a towing vehicle (not illustrated), is then positioned about ten feet in front of the trailer hitch 17 of the trailer 16 by operating the towing vehicle. As illustrated in, FIG. 2, the height of the mirror mount plate 10 above the trailer 16 is then adjusted as required for viewing both the flat mirror 11 and convex mirror 12, either directly from the cab (not illustrated) of the towing vehicle or through the rear view mirror (not illustrated) of the vehicle. Vertical adjustment of the mirror mount plate 10 is accomplished by loosening the shaft adjusting collar 7 on the support shaft 2, raising or lowering the adjusting shaft 6 in the support shaft 2 as indicated by the straight arrow in FIG. 2 and tightening the shaft adjusting collar 7 on the support shaft 2 at the selected height of the mirror mount plate 10 above the trailer frame 18. The curvature of the gooseneck shaft extension 8 is then adjusted as indicated by the curved arrows in FIG. 2, to position the bent mirror mount plate 10 such that initially only the trailer hitch 17 appears in the flat mirror 11, whereas both the trailer hitch 17 and vehicle hitch ball 19 appear in the angled convex mirror 12. Accordingly, as the towing vehicle is backed toward the trailer hitch 17, the driver of the vehicle views the trailer hitch 17 and approaching vehicle hitch ball 19 in the wide field of vision convex mirror 12, either directly or through the rearview mirror (not illustrated) of the vehicle, and the trailer hitch 17 continually appears in the flat mirror 11. The vehicle driver maneuvers the towing vehicle as needed to achieve and maintain alignment of the vehicle hitch ball 19 with the trailer hitch 17 as indicated by the convex mirror 12, until the vehicle hitch ball 19 and trailer hitch 17 both appear as larger images in the flat mirror 11, as illustrated in FIG. 5. Accordingly, due to the closer proximity of the vehicle hitch ball 19 to the trailer hitch 17 when both hitch elements appear in the flat mirror 11, as well as the larger images reflected by the flat mirror 11, the flat mirror 11 gives the vehicle driver a more precise indication of alignment of the vehicle hitch ball 19 and the trailer hitch 17 than does the convex mirror 12. This expedient enables the driver of the towing vehicle to further maneuver the vehicle and successfully guide the vehicle hitch ball 19 to the trailer hitch 17, to facilitate coupling of the vehicle hitch ball 19 to the trailer hitch 17. After coupling is accomplished, the trailer back-up mirror 1 is removed from the trailer 16 simply by moving the switch 5c to the "off" position and detaching the attachment magnet 5 from the trailer frame 18, as illustrated in FIG. 2. The trailer back-up mirror 1 can then be placed in the towing vehicle or a boat or camper (not illustrated) carried on the trailer 16, as desired, for storage. Hitching of the towing vehicle to the trailer 16 is completed in the conventional fashion, typically by locking the hitch 17 on the hitch ball 19 by operation of a hitch lock handle 17a, provided on the hitch 17; coupling hitch safety chains (not illustrated), conventionally provided on the trailer 16, with the towing vehicle; and connecting the electrical wiring between the towing vehicle and the trailer 16.

It will be appreciated by those skilled in the art that the trailer back-up mirror 1 of this invention is capable of use with a variety of different types of trailers 16, including but not limited to boat trailers, camper trailers and RV trailers. An important feature of the invention is the provision of a convex mirror in combination with a flat mirror on a bent mirror plate. The convex mirror enables the driver of a towing vehicle to maneuver the vehicle in a sufficiently precise manner such that both the vehicle hitch ball and trailer hitch subsequently appear as large images in the flat mirror, which more precisely indicates to the vehicle driver whether alignment is sufficient to facilitate coupling of the vehicle hitch ball to the trailer hitch. Moreover, referring again to FIGS. 1 and 2, although the gooseneck shaft extension 8 can be connected directly to the support shaft 2, or may itself serve as the support shaft 2, the height-adjustable feature of the flat mirror 11 and convex mirror 12, facilitated by operation of the shaft adjusting collar 7 and sliding adjusting shaft 6, facilitates positioning of the flat mirror 11 and convex mirror 12 at a sufficient height to enable the towing vehicle driver to view the flat mirror 11 and convex mirror 12 from the cab of a towing vehicle of virtually any size or design. It will be further appreciated by those skilled in the art that the facility for removing the trailer back-up mirror 1 from the trailer frame 18 after coupling of the towing vehicle to the trailer 16, prevents inadvertent falling of the trailer back-up mirror 1 from the trailer 16 and breakage of the trailer back-up mirror 1 which might otherwise occur during towing of the trailer 16. Because the trailer back-up mirror 1 is magnetically attached to the trailer frame 18 and the gooseneck shaft extension 8 facilitates universal positioning of the flat mirror 11 and convex mirror 12, the trailer back-up mirror 1 is capable of attachment to virtually any desired location on the trailer frame 18.

While the preferred embodiments of the invention have been described above, it will be recognized and understood that various modifications in the invention can be made and the appended claims are intended to cover all such modifications which may fall within the spirit and scope of the invention.

Having described by invention with the particularity set forth above, what is claimed is:

1. A trailer back-up mirror for viewing the position of a trailer hitch with respect to a hitch receptacle on a towing vehicle, said trailer back-up mirror comprising a support shaft for attachment to the trailer; a flexible gooseneck shaft extending from said support shaft; a bent mirror plate carried by said gooseneck shaft; and at least one mirror provided on said bent mirror plate for viewing the trailer hitch and hitch receptacle, whereby said mirror can be adjusted to selected orientations with said gooseneck shaft for viewing the trailer hitch and hitch receptacle.

2. The trailer back-up mirror of claim 1 wherein said mirror comprises at least a convex mirror.

3. The trailer back-up mirror of claim 2 wherein said gooseneck shaft is vertically adjustable with respect to said support shaft.

4. The trailer back-up mirror of claim 1 wherein said mirror comprises at least a flat mirror.

5. The trailer back-up mirror of claim 4 wherein said gooseneck shaft is vertically adjustable with respect to said support shaft.

6. The trailer back-up mirror of claim 1 comprising an attachment magnet provided on said support shaft for removably and magnetically attaching said support shaft to the trailer.

7. The trailer back-up mirror of claim 6 wherein said gooseneck shaft is vertically adjustable with respect to said support shaft.

8. The trailer back-up mirror of claim 6 wherein said mirror comprises at least a convex mirror.

9. The trailer back-up mirror of claim 8 wherein said gooseneck shaft is vertically adjustable with respect to said support shaft.

10. The trailer back-up mirror of claim 6 wherein said mirror comprises at least a flat mirror.

11. The trailer back-up mirror of claim 10 wherein said gooseneck shaft is vertically adjustable with respect to said support shaft.

12. A trailer back-up mirror for viewing the position of a trailer hitch with respect to a hitch receptacle on a towing vehicle, said trailer back-up mirror comprising a support shaft for attachment to the trailer; an adjusting shaft adjustably carried by said support shaft; a gooseneck shaft extension extending from said adjusting shaft; a bent mirror plate carried by said gooseneck shaft; and a flat mirror and a convex mirror mounted on said bent mirror plate, respectively, for viewing the trailer hitch and hitch receptacle.

13. The trailer back-up mirror of claim 12 comprising an attachment magnet provided on said support shaft for removably and magnetically attaching said support shaft to the trailer.

14. A trailer back-up mirror for mounting on a boat trailer and viewing the position of a trailer hitch with respect to a hitch ball on a towing vehicle, said trailer back-up mirror comprising a support shaft and an attachment magnet provided on said support shaft for removably and magnetically attaching said support shaft to the boat trailer; an adjusting shaft adjustably extendible from said support shaft; a gooseneck shaft extension provided on said adjusting shaft and a bent mirror mount plate terminating said gooseneck shaft extension; and a flat mirror and a convex mirror carried by said bent mirror mount plate in separate planes for viewing the trailer hitch and hitch ball, whereby said bent mirror mount plate can be adjusted to selected orientations with said gooseneck shaft extension for viewing the trailer hitch and the hitch receptacle in said flat mirror and said convex mirror.

* * * * *